US006725223B2

(12) United States Patent
Abdo et al.

(10) Patent No.: US 6,725,223 B2
(45) Date of Patent: Apr. 20, 2004

(54) STORAGE FORMAT FOR ENCODED VECTOR INDEXES

(75) Inventors: Abdo Esmail Abdo, Rochester, MN (US); Kevin James Kathmann, Rochester, MN (US); Kurt Walter Pinnow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/747,071

(22) Filed: Dec. 22, 2000

(65) Prior Publication Data

US 2002/0083033 A1 Jun. 27, 2002

(51) Int. Cl.[7] .................................................. G06F 7/00
(52) U.S. Cl. ..................................................... 707/100
(58) Field of Search .............................. 707/100, 1, 2, 707/9, 10, 204, 101, 104.1

(56) References Cited

U.S. PATENT DOCUMENTS 4,847,749 A * 7/1989 Collins et al. ............... 710/264
5,444,488 A * 8/1995 Goubault et al. ........ 375/240.14
5,511,190 A * 4/1996 Sharma et al. .................. 707/1
5,842,224 A * 11/1998 Fenner ......................... 370/392
5,897,637 A * 4/1999 Guha .......................... 707/100
6,212,525 B1 * 4/2001 Guha .......................... 707/100

* cited by examiner

Primary Examiner—Safet Metjahic
Assistant Examiner—Sana Al-Hashemi
(74) Attorney, Agent, or Firm—Wood, Herron & Evans, LLP

(57) ABSTRACT

A storage format and methods for improving the performance of the symbol table of an encoded vector index. The symbol table comprises a hash table, entries of the hash table storing associated key values and codes for the encoded vector index. Hash table entries store an accumulated count of occurrences of prior and the current key values, which improves the efficiency of responding to a request for a key range count. A binary radix tree is used to locate entries, which comprises a plurality of nodes, corresponding to binary digits of a binary representation of a key value. Codes are assigned to key values for the encoded vector index in a distributed fashion, so there are available code values between existing code values in the code ordering, that can be assigned to new key values, alleviating the need to reorganize the code values upon an insertion.

34 Claims, 11 Drawing Sheets

STORAGE FORMAT FOR ENCODED VECTOR INDEXES

FIELD OF THE INVENTION

This invention generally relates to a database management system performed by computers, and more specifically relates to the storage format of an encoded vector index (EVI).

BACKGROUND OF THE INVENTION

An index in a book facilitates locating information on a specific topic quickly and without blindly paging through the book. Database indexes provide similar benefits by providing a method to quickly locate data of interest. Without an index, a database performs a full table scan, blindly searching through every row in a database table until the target data is located. Thus, depending upon where data resides in a database table, such a scan can be a lengthy and inefficient process.

Indexed scans of database tables are more efficient than full table scans since the length of database index entries are in most cases shorter than the database table entries. Shorter entries mean that more index entries can be stored in a single computer page. Indexed scans can therefore result in a considerable reduction in the total number of computer pages that must be processed in order to locate the requested data.

While indexed scans of database tables can improve performance, the complexity of the data being scanned and of the nature of the database query still determine how effectively a query can be implemented. Different queries place differing levels of processing demands on the database in unique ways. As a result, different index types are needed to cope with a users' ever-changing workloads. One type of index is the encoded vector index (EVI), disclosed U.S. Pat. No. 5,706,495, Chadha et al., Jan. 6, 1998, Encoded-Vector Indices For Decision Support and Warehousing (hereinafter "Chadha"), which is incorporated by reference.

An encoded vector index (EVI) is a variation of the bitmap index concept. A bitmap index indicates whether a specific value exists for each row in a particular column. One bit represents each row. Thus, in the bitmap index for the value "MN" in the column "LOCATION," the nth bit equals 1 if the nth row of the data table contains "LOCATION"="MN," or 0 if that row holds a value other than "MN." An EVI serves a similar purpose, but only one index is necessary to account for all the values occurring in the column (whether they be "NY," "MN," or any other). So in an EVI on the "LOCATION" column, the nth position of the EVI contains a bit code that identifies the value of "LOCATION" in the nth row of the table. Thus, whereas a separate bitmap index is required to map each particular key value in a database field, only one EVI is required to represent the same information. Thus, an EVI saves computer memory by including all possible key values for a given field in one database index. Chadha discloses a method to efficiently scan relational database information by performing bit-vector operations on EVI's, instead of performing analogous operations on the relational database table itself.

Referring now to FIG. 1, a diagram explaining the components of a typical encoded vector index is illustrated. In this example, the EVI indicates which key value exists in the encoded database field for each relative database record number in a database table 40. Database table 40 is an exemplary database identifying locations and departments, for example, of a corporate organization. The EVI is formed over the location field 42 of the database 40, which may include a large number of other fields (not shown).

The EVI 45 is made up of two tables: EVI symbol table 50 and EVI vector 60. EVI symbol table 50 has an entry for each particular key value that can be found in the database field (in this case, the LOCATION field) of the particular database or database subset 40 for which the EVI is an index. FIG. 1 illustrates an EVI for a subset of the database 40, namely, the LOCATION field. Since only three different values appear in the LOCATION field of the database, EVI symbol table 50 contains three rows, one for each particular key value: "MN," "ND," and "WY." Notably, the key values in the EVI symbol table 50 are stored in a sorted order, so that a given key value can be found in the table using an alphabetic binary search through the table. The EVI symbol table 50 provides a code for each of these key values, and further provides a count for each of these key values, indicating how many records in the database table contain the key value. The codes in the EVI symbol table 50 are used to decode EVI vector 60, as described below. Notably, the codes are assigned to keys so that the codes are also in sorted order. The purpose of this will be explained below.

EVI vector 60 contains a row for every record in the database 40 for which the EVI is an index. Each vector row corresponds to a database record, and contains a code for the key value contained in the EVI indexed field. EVI vector 60 contains 20 rows, because there are 20 records in the database for which EVI is an index. Each code stored in EVI vector 60 corresponds to the value that exists in the EVI field in the corresponding database record.

The translation of the code is made possible by EVI symbol table 50. For example, for the first record in the database 40, the LOCATION field 42 in database 40 has a value of "MN," which corresponds to a code of 1 in EVI symbol table 50. The first relative record in EVI vector 60. By looking at EVI symbol table 50, it can be seen that code 0 equates to a key value in the EVI field of "MN."

Use of the EVI proceeds as outlined above. To search for a particular key value, that key value is converted to a code, and then the EVI vector is scanned, identifying each row in which there is a match to the desired code. Often the results are represented as a bit vector index, which can then be combined with other bit vector indexes to identify the results of a complex query. To search for records using a key range, the EVI symbol table is used to convert keys at the beginning and end of the range into codes. Then, the EVI vector is scanned, identifying each row having a code that falls between the codes for the range endpoints. As noted above, the codes are assigned to the keys in a sorted order, that is, so that the codes sort into the same order as the keys; thus, codes may be numerically compared to the range endpoint codes as the EVI vector is scanned to identify rows that meet a key range.

As noted above, EVI's are built to reflect the counts and key values in one or more particular database fields, as those values exist in a database at the time that the EVI is built. Unfortunately, databases are frequently updated. In order for an EVI to stay current and accurately reflect a database, the EVI must he updated whenever the value of the one or more field(s) over which the EVI is built changes. This also applies when new records are added to the database and when new records are deleted.

Changes to the relational database table can affect an EVI symbol table in two ways. First, a change to the database may only require a change in key count for one or more key values. An example of this first type of change is deleting a database record, adding a record having a key value that already exists in the EVI symbol table 50, or changing a database field from one key value to a second key value that also exists in the EVI symbol table 50. In this first type of change, the EVI symbol table 50 is updated by updating the key count(s) to reflect the changes made to the database fields itself, without requiring a new EVI symbol table entry. At the same time, the EVI vector 60 is updated by deleting, adding or modifying the record corresponding to the changed record.

The second type of change to a database requires a new EVI symbol table entry. An example of this type of change is when a new key value is added to a database field, that is, a record that is modified or created is given a key value that does not exist in that particular database field in any other record in the database. A new key value might replace an old key value, as part of a change to an existing database record. Alternatively, a new key value might be assigned to database field when adding a new database record. Either way, the new key value will not exist in an existing EVI symbol table.

As noted above, the EVI symbol table 50 is stored in a sorted order by key value. Now, in the event of a new key value in the EVI field, a new EVI symbol table entry must be created. Typically, the new entry is added to the end of the existing EVI symbol table. The EVI symbol table thus includes a sorted area, followed by an unsorted area at the end of the sorted area. When there is an unsorted area, searches of the EVI symbol table require both an alphabetical search of the sorted area and a linear scan of the unsorted area. Furthermore, when responding to a key range query, the scan of the EVI vector must include both evaluating codes against the codes of the range endpoints, and comparison to codes from the unsorted area of the EVI symbol table for keys in the specified range. In both cases, the efficiency of processing the EVI is reduced.

To mitigate these inefficiencies, when the unsorted area of the EVI symbol table becomes excessively large, the EVI symbol table is rebuilt in order for all entries to be properly sorted. Unfortunately, rebuilding an EVI can itself be costly and create delays in processing. Furthermore, in highly active databases, even with frequent rebuilding, the unsorted areas of the symbol table can become unacceptably large due to frequent additions of key values to the table, most particularly due to additions made while the symbol table is being rebuilt.

Accordingly, new ways to store and manage indexes, such as EVI's, are needed in order to continue to provide significant improvements in query performance; otherwise, database users will be hampered in their ability to maximize intelligent information retrieval.

SUMMARY OF THE INVENTION

In accordance with principles of the present invention, these needs are met through the use of a new storage format for the symbol table of an encoded vector index. Specifically, the symbol table comprises a hash table, entries of the hash table storing associated key values and codes for the encoded vector index. A hash table entry is assigned to a key value by performing a hash function upon a binary representation of the key value, to produce an index into the hash table. This storage format has the advantage that the hash table is not ordered and so need not be reorganized upon insertion or deletion of key values.

In a related aspect, a binary radix tree is used to locate data structures (such as entries in the hash table) that store information for key values in an encoded vector index. The binary radix tree comprises a plurality of nodes, nodes of the tree corresponding to binary digits of a binary representation of a key value, and branches in the tree corresponding to values of binary digits of said binary representation. A given binary representation for a key value thus corresponds to a path through the tree, ending in a terminal node. The terminal node contains a pointer to a data structure storing information for the key value. The binary radix tree thus permits the binary representation of a key value to be rapidly converted to a pointer to a corresponding data structure, so that the data structures need not be stored in an ordered manner, as is the case with entries in a hash table.

To further reduce the need to rebuild an index due to updating, in an additional aspect, the invention features methods for assigning codes to key values used in a encoded vector index. As noted above, codes are assigned to key values for an encoded vector index such that when the are sorted according to a code ordering, the key values corresponding to the codes are also sorted according to a key value ordering. However, in contrast to known methods for assigning codes for use in encoded vector indexes, in accordance with principles of the present invention, the codes are distributed such that at least one pair of adjacent codes in the code ordering have non-sequential values. By distributing the codes in this manner, upon insertion of a new key value into the index, there is more likely to be an available code value, between existing code values in the code ordering, that can be assigned to the new key value, alleviating the need to reorganize the code values upon such an insertion.

This aspect of the invention further features novel methods for selecting a code value corresponding to an inserted key value, by comparing the inserted key value to predecessor and successor key values in the key value ordering to determine the relative position of the inserted key value between the predecessor and successor key values. (This may be based, e.g., on the number of common bits in binary representations of the key values.) Then a code is selected for the inserted key value that is analogously positioned within the range of codes between the codes of the successor and predecessor key values.

A further aspect of the invention relates to embellishment of the information in a symbol table for an encoded vector index, to facilitate the generation of key range count. Respective storage locations of the symbol table store, in addition to key values and code values assigned to those key values an accumulated count of (a.) occurrences of the key value in the storage location, and (b.) occurrences of key values that precede, in a key value ordering, the key value in the storage location. This information may be used when responding to a request for a key range count by retrieving the accumulated count for the beginning and ending key values in the key range, and then subtracting the accumulated count for the beginning key value from the accumulated count for the ending key value. The accumulated key values are updated when key values are inserted or deleted so that they always accurately reflect the desired accumulated count.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 2:
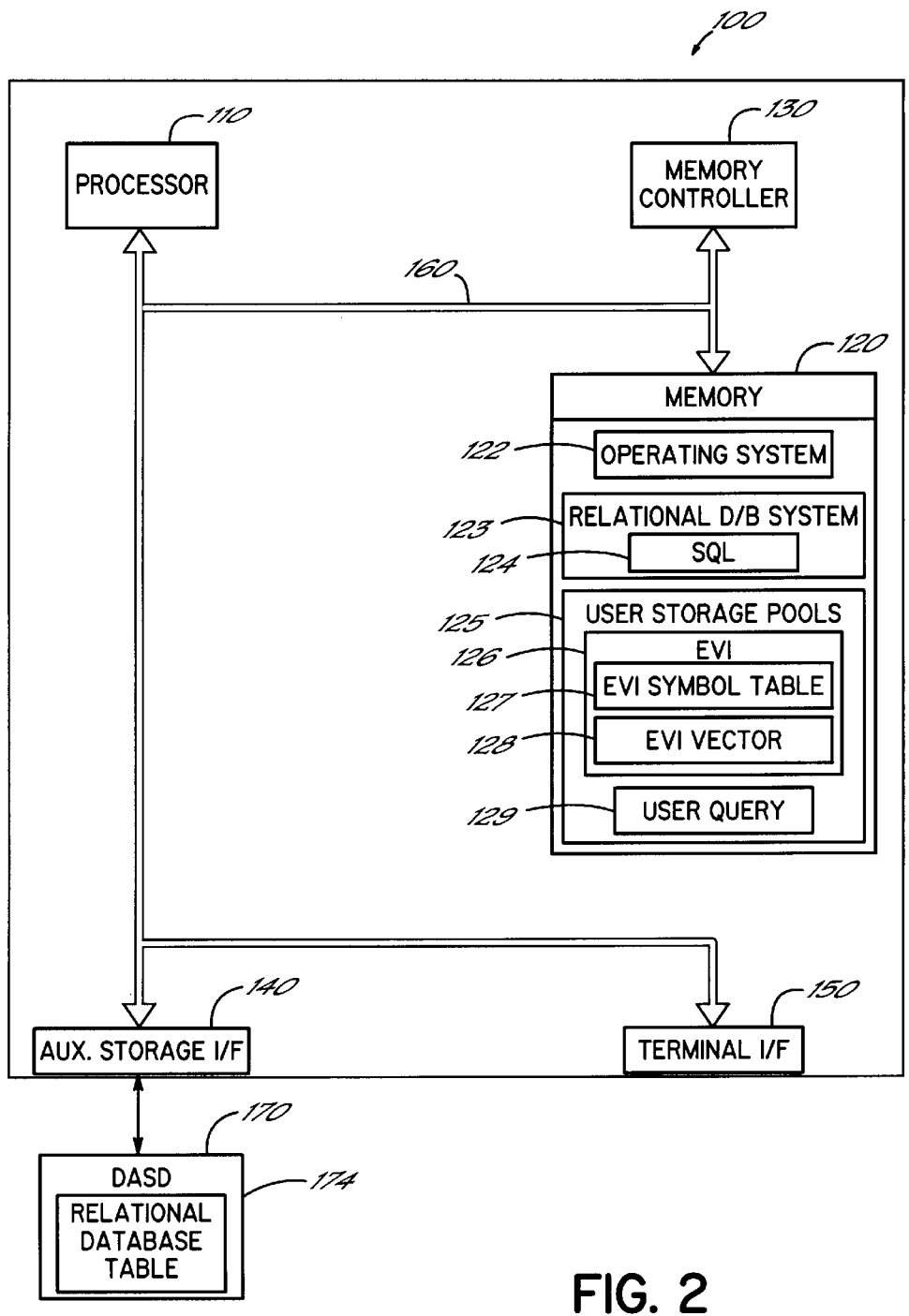
FIG. 2 is a block diagram of an apparatus according to an embodiment of the present invention.

The methods of the present invention employ computer-implemented routines to query information from a database. Referring now to FIG. 2, a block diagram of a computer system which can implement an embodiment of the present invention is shown. The computer system shown in FIG. 2 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 2 within the scope of the present invention such as the addition of cache memory or other peripheral devices. FIG. 2 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table 174 from auxiliary storage devices, such as magnetic disk (e.g., hard disks or floppy diskettes) or optical storage devices (e.g., CD-ROM). As shown in FIG. 2, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present intention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 2 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include an encoded vector index (EVI) 126, and a user query 129. EVI 126 includes an EVI symbol table 127 illustrated in FIG. 3 herein, and an EVI vector 128. EVI 126 is a database index for a relational database table, such as relational database table 174, that is stored in DASD 170. User query 129 is a request for information from relational database table 174 stored in DASD 170. The methods of the present invention do not require that the entire relational database table be loaded into memory 120 to obtain the information requested in user query 129. Instead, EVI 126 is loaded into memory 120 and provides relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 2, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular encoded vector index (EVI) 126 exists that might scan more efficiently than another database index or than the relational database housed in DASD 170. In order for an EVI to be useful to the methods of the present invention, the EVI must be built over the database fields specified by the criteria in user query 129. That is, there must be an EVI index for those particular fields in that particular database. Fields that are indexed are called EVI fields in the EVI. If an EVI with the appropriate EVI fields exists, relational database system 123 will opt to perform an indexed scan of that EVI, instead of a scan of some other traditional database index, or a scan of relational database table 174 itself.

The field of relational database 174 mapped by EVI 126 is called an EVI field. Sometimes, an EVI can be built over more than one database field. In this case the EVI fields include a leading EVI field, and one or more secondary EVI fields. Then, the information stored in EVI 126 is hierarchically indexed first by the leading EVI field, and further by one or more secondary key fields.

Figure 3:
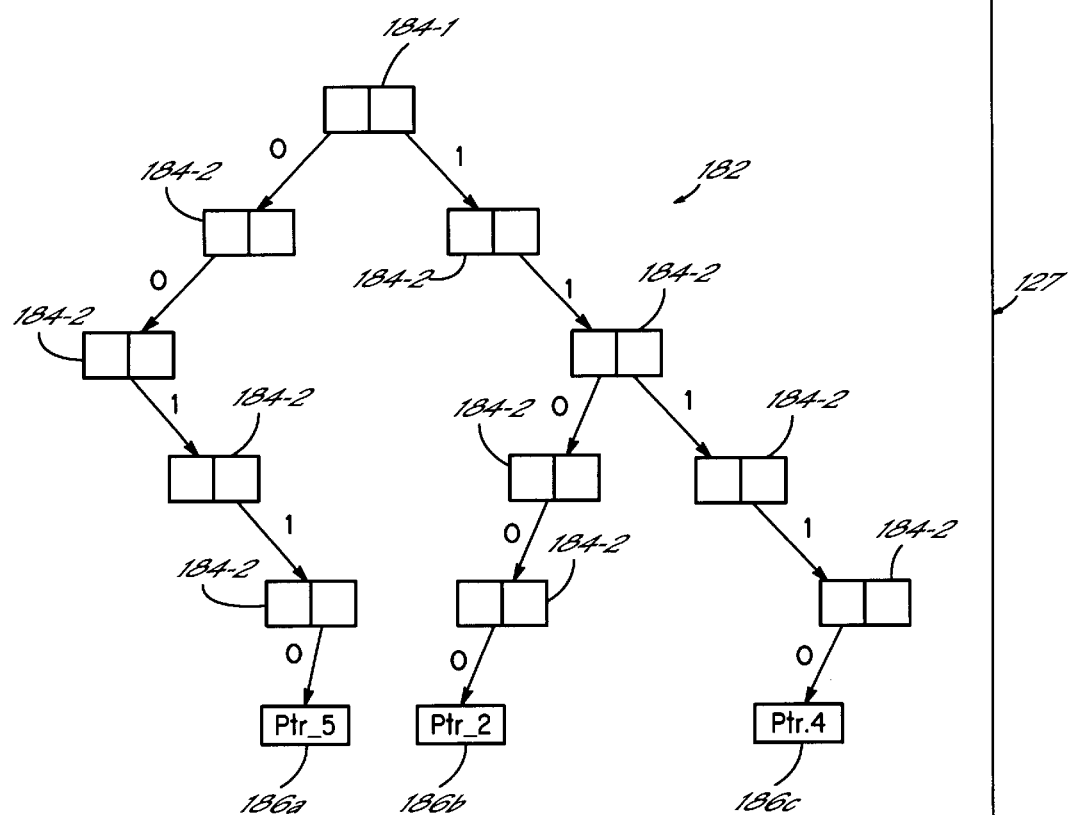
FIG. 3 illustrates a storage format of a symbol table of an encoded vector index in accordance with the principles of the present invention.

Referring now to FIG. 3, an EVI symbol table 127 in accordance with the principles of the present invention comprises two components. The first component is a hash table 180 for storing data related to key values. The second component is a binary radix tree 182 providing an index into the hash table 180. It will be appreciated that key values in a database may be stored in one of a number of binary representations, including an ASCII representation, EBCDIC encoded representation, or other representations. The binary representation used for a key value normally consumes a greater number of bits than the code used in an EVI symbol table and EVI vector of an encoded vector index. Thus, while a single byte of data may be used to store codes associated with key values in an EVI symbol table and EVI vector, strings of several bytes may be used to store the key value itself, in its binary representation in the database.

In the EVI symbol table 127 illustrated in FIG. 3, the binary representation of the key value is used to identify one of a plurality of entries of hash table 180, using a hash function. Hash functions are known in the art and used to transform a binary value to another binary value that serves as an index into a finite hash table.

Each row in hash table 180 includes four fields. A first, distinct value, field stores the binary representation of a key value that has been assigned to the hash table entry. Typically, not all hash table entries will be assigned to key values, and therefore several hash table entries will typically have no values in the distinct value field.

Figure 1:
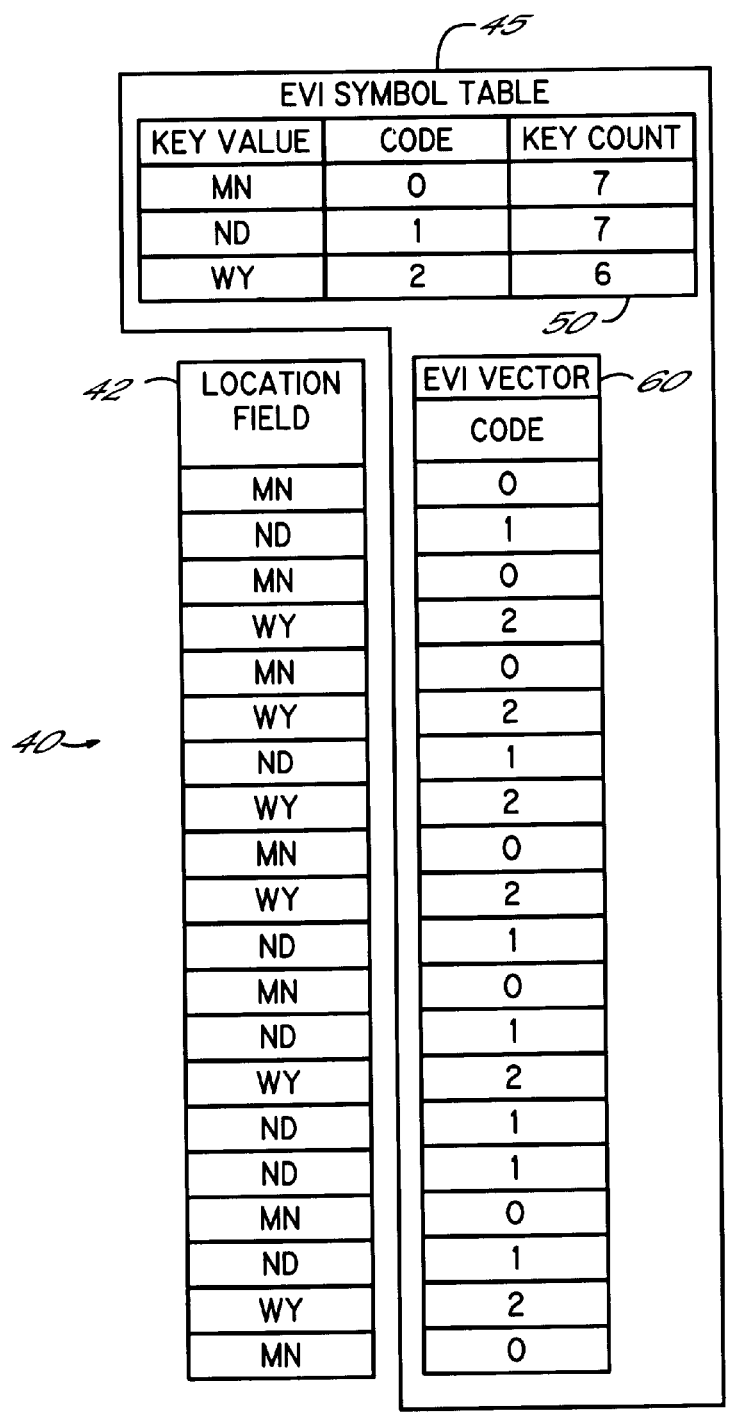
FIG. 1 illustrates a typical storage format of an encoded vector index.

When a hash table entry is associated with a key value, additional statistics and information regarding that key value can be found in additional fields of the hash table. A count field of the hash table stores a count of a number of records in the associated database table 40 (FIG. 1) that include the identified key value. This count field is analogous to the key count field found in known EVI symbol tables such as that shown in FIG. 1.

A second field in a hash table entry is an accumulated count field, which stores the accumulated total of counts associated with key values that precede the key value assigned to the hash table entry. The accumulated count field may be used in generating key range statistics in the manner described below with reference to FIG. 4D.

The accumulated counts shown in FIG. 3, for the representative key values shown there, can be referenced to understand the use of accumulated key value field. Specifically, the first key value in the sort order (which is alphabetical) is the key value AZ which appears in the fifth hash table entry. The count for the key value AZ is two, and accordingly the accumulated count for this first key value is also two. The second key value in hash table 180 in the sort order is the key value CA, which appears in the second hash table entry. The count for this key value is two, and therefore the accumulated count for this key value is four, representing the count of two for the value of AZ accumulated with a value of two for the count CA. The third key value in the sorted order in hash table 180 is the key value MN, which appears in the fourth hash table entry. The count for this key value is three, and therefore the accumulated count stored in the fourth hash table entry is seven.

It will be noted that, as is typical in hash table methodologies, the ordering of the hash table entries assigned to key values is random, as compared to the ordering of those key values in their sorted order. The hash function used to associate a key value and its binary representation with a hash table entry, is selected so as to enhance randomization of the assignment of key values to hash table entries.

A final field in a hash table entry is a code field. This field stores a binary code that is assigned to the key value associated with the hash table entry. Binary codes are assigned to key values in accordance with an assignment process outlined below with reference to FIG. 5D. Code values are assigned, as noted above, so that the code values sort into the same ordering as the key values to facilitate the use of the encoded vector index in key range selection queries as described above. Codes may be assigned as sequential binary numbers as is done in conventional encoded vector indices such as that described above. Alternatively, codes may be assigned in a distributed manner described more fully below with reference to FIG. 5D, in a way that permits insertion of key values and codes therefore into the EVI symbol table 176 without reassignment of existing codes, as is described in more detail below. Exemplary codes for the key values shown in FIG. 3 are distributed in this manner. Thus, the first key value in the hash table 180 AZ has a code of 1, but the second key value in the sort order, CA, has an associated code of 42. Thus, the key values have been distributed to permit insertion of up to 40 additional key values between the key value CA and the key value AZ before the codes must be reassigned to the key values.

It will be appreciated that a storage space penalty is associated with distributing key value codes, for the reason that distributed key value codes will require a larger number of bits to represent in hash table 180, than undistributed sequentially numbered key value codes. The storage space penalty for distributing key value codes must be balanced against the efficiency improvements achieved by distributing those codes, namely, avoiding reassignment of codes with key value insertions. It will be further appreciated that a measure of key value code distribution can be performed without storage penalty, due to the typically unoptimized manner in which binary numbers are stored in storage systems. Typically, the minimum size allocation unit in a storage device is one or a small number of bytes. Thus, to store a key value code that will may have a value ranging from 1 to 257, it is necessary to use two bytes of storage space, because a value of 257 cannot be represented in eight bits. However, two bytes of storage space may represent values as large as 65,536. Thus, there is an inefficiency inherent in the storage of key codes when using minimum allocation units. This means that key codes stored in this sort of inefficient manner may be distributed without storage space penalty. For example, in the situation described above, key codes ranging from 1–257 may be distributed in a range of 1–65,536, permitting an average of 256 key codes between each key code used.

A second aspect of EVI symbol table 127 shown in FIG. 3 is binary radix tree 182. Binary radix tree 182 consists of a tree of data structures 184 including an initial data structure 184-1 and a plurality of intermediate data structures 184-2. Each data structure 184 stores first and second pointers. A first pointer is associated with a binary value of zero and a second pointer is associated with a binary value of one. Binary radix tree 182 includes a plurality of branches formed from intermediate nodes 184-2, each of which terminates in a terminal node 186. The sequence of intermediate nodes 184-2 leading from node 184-1 to a given terminal node 186 is associated with a sequence of binary digits. For example, the path leading from node 184-1 to terminal node 186a is associated to the binary digits 00110. The path from node 184-1 to terminal node 186b is associated with binary digits 11000, and the path to terminal node 186c is associated with the binary digits 11110.

Terminal nodes 186 of binary radix tree 182 store pointers to entries in hash table 180. The sequence of binary digits leading to a terminal node 186 is exactly the binary representation of the key value associated with the hash table entry identified by the terminal node 186 reached using those binary digits. Thus, binary radix tree 182 is an index to hash table 180, and may be used to locate the hash table entry associated with the key value by following a path through binary radix tree 182 that corresponds to the binary digits of the binary representation of that key value. When a key value is assigned to a hash table entry, binary radix tree 182 is updated to include a terminal node 186 with a pointer to the hash table entry, as well as a path of intermediate nodes 184-2 leading to that terminal node that is associated with the digits of the binary representation of the key value.

It will be appreciated that different binary representations may be used for different kinds of key values in a database, and accordingly differing strings of binary digits may be represented in binary radix tree 182 to associate a binary representation of a key value with an entry into hash table 180. The number of intermediate nodes 184-2 from node 184-1 to a terminal node 186 may vary widely depending upon the binary representation that is used to store key values in database 40.

It will be further appreciated that key values stored in database 40 will have a sort order, such an alphabetic sort order, that can used to identify ranges or criteria for selecting key values using, e.g., "greater than" or "less than" operators. Binary radix tree 182, because it incorporates the binary representation of key values, may be used to not only identify key values that are equal to a specified key value, but may also be used to identify key values larger than a specified key value, or key values smaller than a specified value. Identification of key values that are larger or smaller than a specified value requires exploring paths through binary radix tree 182 that would be associated with larger key values. For example, where key values are represented by ascending binary values, larger key values in the sort order may be used by following pointers associated with binary digits of 1, at any intermediate node where the specified key value has a binary digit of 0. In other representations, other methods may be used to identify key values larger than a specified key value.

Figure 4A:
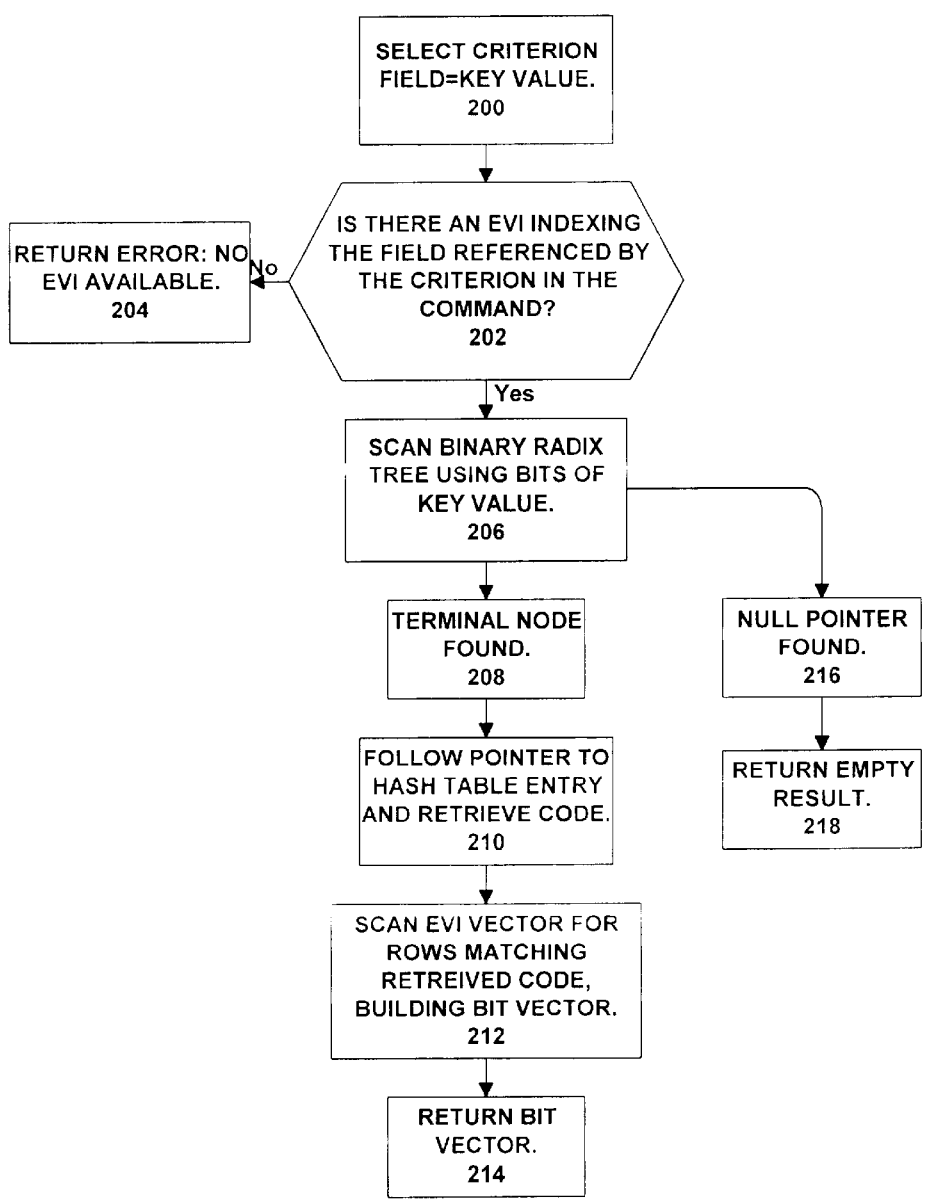
FIGS. 4A–4D are flow charts of the processes for looking up key codes and counts in the symbol table for FIGS. 3A–3C.

Referring now to FIG. 4A, the process for identifying results for a selection criterion 200 for identifying a specific key value can be explored. In the first step 202, it is determined whether there is an encoded vector index indexing the field referenced by the criterion in the SQL command. If not, then in step 204 an error is returned indicating that no encoded vector index is available to evaluate the criterion. If an encoded vector index is available, then in step 206 the binary radix tree 182 is scanned using the bits of the binary representation of the key value. If the key value is in the encoded vector index, then a terminal node will found in the step 208. In this case, in step 210, the pointer in the terminal node 186 is followed to a hash table entry, and then the code in that hash table entry is retrieved. In step 212, this code is used to scan the EVI vector 60 (FIG. 1) to search for rows having a code matching the retrieved code. In this process a bit vector may be created, identifying those database records in which this selection criteria is satisfied. In step 214, the bit vector is returned for use in assimilating the results of the query.

In step 206, the scan of the binary radix tree 182 may terminate before reaching a terminal node 186. If a specified key value is not in the database table 40, then the binary representation for that key value will not lead to a terminal node 186 in binary radix tree 182. Rather, at some point during a scan of binary radix tree 182 using binary digits of the binary representation of the key value, a null pointer will be encountered at an intermediate node 184. A null pointer in an intermediate node 184 in binary radix tree 182 indicates that no key values are currently in the encoded vector index that have a binary representation matching the path through the binary radix tree 182 leading to the null pointer. This means that the key value that led to the null pointer is not found in the database 40.

Accordingly, if the scan of step 206 reaches a null pointer in step 216, in step 218, an empty result will be returned indicating the selection criterion will have no results for the reason that the specified key value is not in the database at the present time.

Figure 4B:
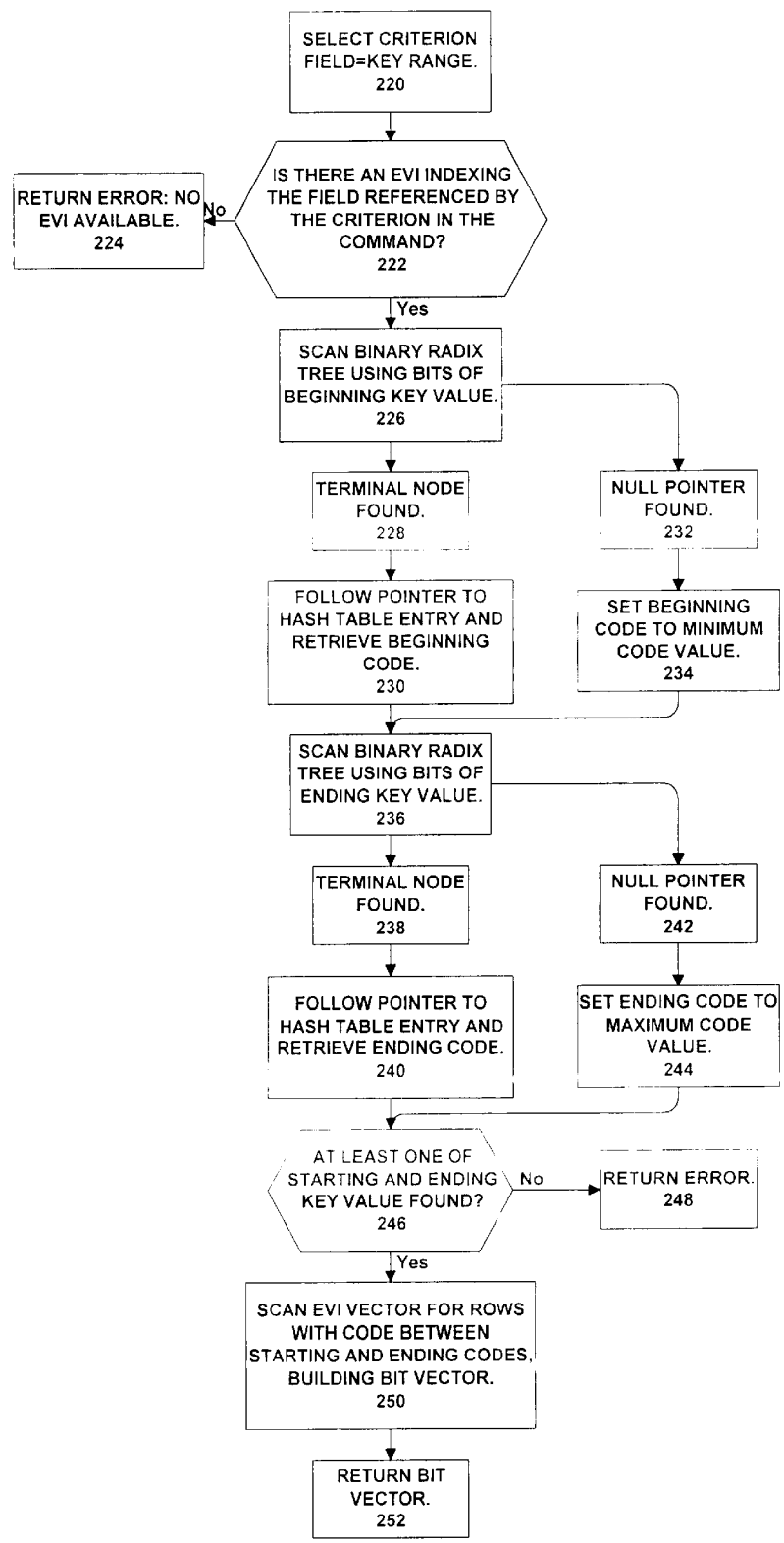

Referring now to FIG. 4B, another form of query that may be handled by the encoded vector index, is a criterion specifying a key range 220. To evaluate such a criteria, in the first step 222 it is determined whether there is an encoded vector index indexing the field referenced by the criteria. If not, in step 224 an error is returned indicating that an encoded vector index is available. If a encoded vector index is available, then in step 226, the binary radix tree is scanned using the binary representation of the key value that begins the key range specified in the selection criterion. This scan will lead to a terminal node 186 in step 228, if the beginning key value is in the database 40. In this case, the pointer in the terminal node 186 is followed to the hash table entry associated with the beginning key value, and a beginning code associated with the key value is retrieved in step 230.

If the scan of the binary radix tree using the beginning key value terminates at a null pointer in step 232, then the beginning key value specified in the key range selection criterion is not in the database 40. In this circumstance, any keys that precede the ending key value are deemed to satisfy the query. To facilitate this, a value representing the minimum code value that may be used in the encoded vector index, is assigned as the beginning code, so that any key values prior to the ending key value identified in the criterion will be retrieved.

Following assignment of the beginning code value in step 230 or 234, the ending key value in the selection criterion is used in step 236 to again scan the binary radix tree. This scan will either identify a terminal node in step 238 or a null pointer. If a terminal node is identified, then in step 240, the pointer in the terminal node is followed to the hash table entry associated with the ending key value, and the code for that hash table entry is retrieved for use as the ending code.

If the scan of step 236 results in identification of a null pointer in step 242, then all key values that are subsequent to the beginning key value identified in the criterion should be retrieved. To accomplish this, in step 244, the code value representing the maximum code that may be assigned to a key value, is set as the ending code. This will cause any key values subsequent to the beginning key value to be retrieved.

After assignment of the ending code value in step 240 or step 244, in step 246 it is determined whether at least one of the starting and ending key values of the key range of the criterion was found in the encoded vector index. If neither to starting nor ending key value in the range was found in the index, then the key range operation has an undefined result. In this situation, in step 248, an error is returned. If, however, at least one of the starting or ending values was found, then in step 250, the EVI vector is scanned for rows having a code that is between the starting and ending codes identified in the preceding steps. As noted above, the codes assigned to key value have an ordering which matches the ordering of the key values, so that the evaluation of codes from the EVI vector, may proceed by comparing those codes to the starting and ending codes associated with the starting and ending key values of the selection criterion, to thus identify codes of key values that meet the key range criterion. This scan of the EVI vector may generate a bit vector identifying those database records which match the selection criterion. After step 250 is completed, the bit vector generated in that step is returned in step 252, as a result of the evaluation of the selection criterion using the encoded vector index.

Figure 4C:
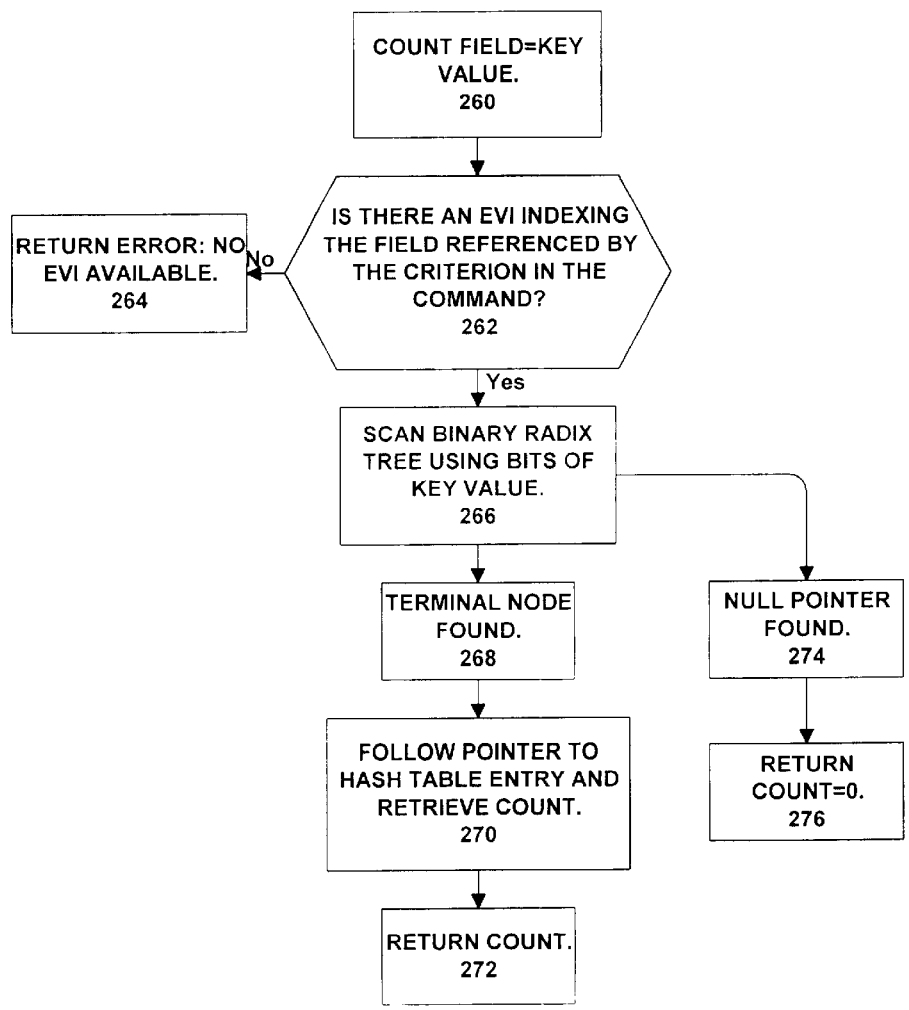

Referring now to FIG. 4C, the process for producing a count statistic in response to a query identifying a key value can be discussed. In a first step 262, it is determined whether there is an encoded vector index indexing the field referenced by the command. If not, then an error is returned indicating that no encoded vector index is available in step 264. If an encoded vector index is available, then in step 266, the binary radix tree 182 is scanned using the binary representation of the specified key value. If this scan identifies a terminal node in step 268, then the pointer in the terminal node is followed to a hash table entry in step 270, and the count in that hash table entry is retrieved. This count represents the number of records in the database having a key value matching the selection criterion. Accordingly, this count is returned in step 272 as the result of the query.

If the scan of the binary radix tree 182 in step 266 terminates at a null pointer at a intermediate node binary radix tree 182, then there are no records in the database matching the specified key value. In this case, a count of zero is returned in step 276.

Figure 4D:
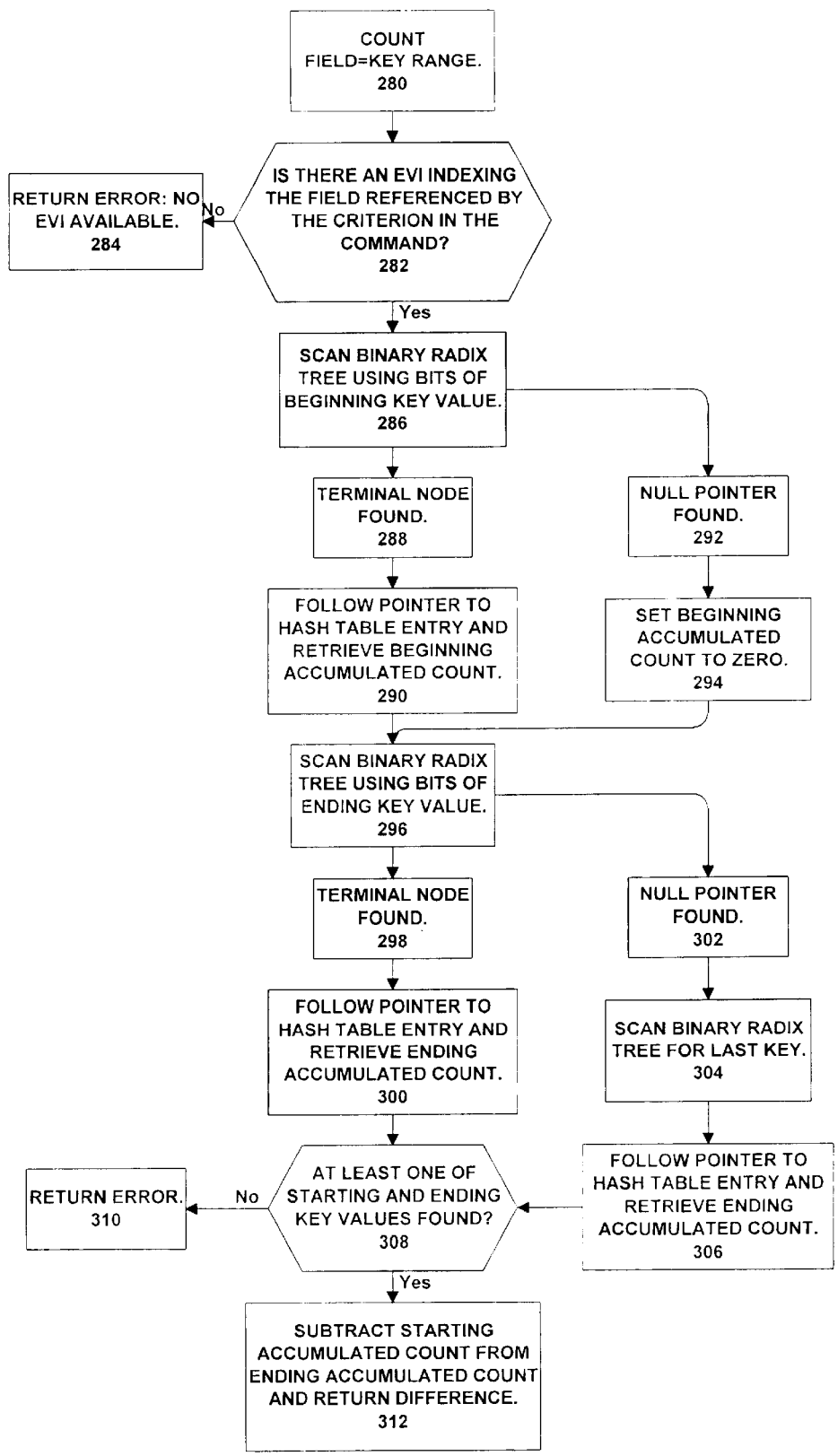

Referring now to FIG. 4D, the process for creating a key range statistic in response to the key range count request in step 280 can be described. In step 282 it is determined whether there is an encoded vector index for the field reference by the command. If not, then in step 284, an error is returned. If there is an EVI for the field reference by the command, then in step 286, the binary radix tree 182 is scanned using the bits of the binary representation of the beginning key value in the key range. If a terminal node is found in step 288, then in step 290 the pointer in the terminal node is followed to the hash table entry associated with the key value and the accumulated count in that hash table entry is retrieved so that it may be used as a beginning accumulated count in later processing. If a null pointer is found in step 292, then the beginning accumulated value is set to a value of zero in step 294.

After determining the beginning accumulated count, in step 296 the binary radix tree 182 is scanned using the binary representation of the ending value in the command. If a terminal node is found in this scan in step 298, then in step 300 the pointer in the terminal node is followed to hash table entry associated with the ending key value, and the accumulated count is retrieved for use as the ending accumulated value. If the scan in step 296 terminates at a null pointer in an intermediate node, in step 302, then a new scan in the binary radix tree 182 is performed for the key value having the last position in the sorted order in step 304. As noted above, this may be done by following a path through binary radix tree 182 by selecting at each intermediate node any non-null pointer along the path associated with the largest key values in the sort order. After finding the last key in the sort order, in step 306 a pointer in the terminal node for the last key in the sort order is followed to the corresponding hash table entry and the accumulated count from that entry is retrieved to be used as the ending accumulated count.

After the foregoing steps, in step 308 it is determined whether at least one of the starting or ending key values was found in the preceding scans of the binary radix tree 182. If not, then the key range command is undefined, and an error is returned in step 310. If at least one of the starting or ending key values is found, then in step 312 the starting accumulated count is subtracted from the ending accumulated count and the difference representing the number of key values matching the key range specified in the key range is returned.

Figure 5A:
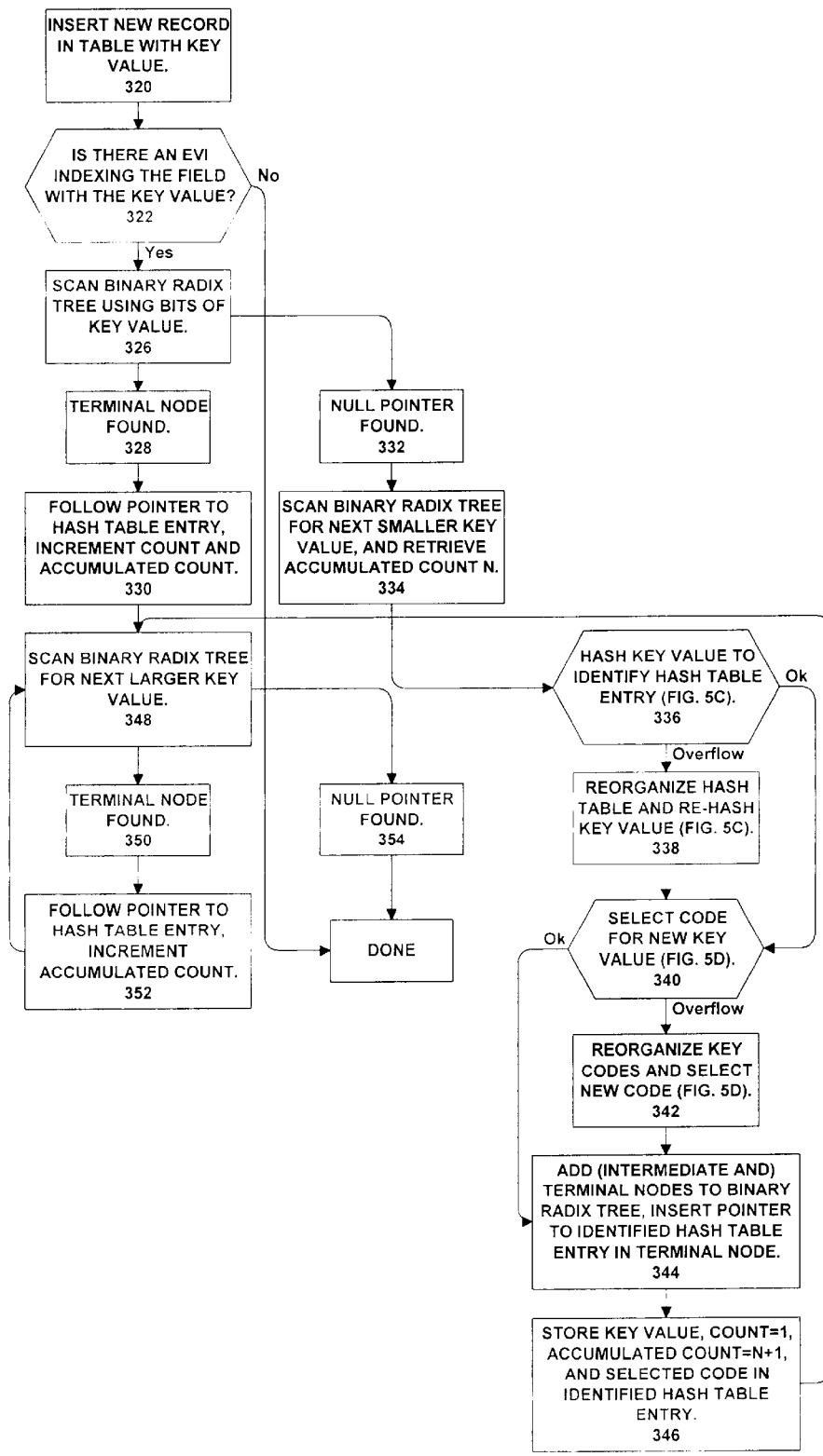
FIGS. 5A–5D are flow charts of the process for inserting and deleting values in the EVI symbol table of FIG. 3, and the hash and code value selection functions used in these processes.

Referring now to FIG. 5A, process for inserting a record into the EVI symbol table 127 of FIG. 3 can be explained. This process is performed any time a new record is inserted into a table in step 320. In step 322, it is determined whether there is an EVI indexing the field added to the table. If not, then no processing of the EVI symbol table need be done.

If there is an encoded vector index that needs to be updated, then in step 326 the binary radix tree 182 is scanned using the bits of the binary representation of the key value in step 326. If the scan leads to a terminal node in step 328, then it is determined that there is a entry in the hash table for the key value added to the table. In this case, the pointer in the terminal node is followed to the associated hash table entry in step 330. Then the count in the accumulated count values in the hash table entry is incremented.

If the scan of step 326 leads to null pointer in step 332, then there is no value currently in the EVI symbol table 127 for the key value added in the new record. In this case, a new hash table entry must be added for the new key value. Accordingly, in step 334, the binary radix tree 182 is scanned to identify the key value in the radix tree which is the largest key that it is smaller than the new key value that is being added to the table. This key value, which is the next smaller key value in the table, is used to assemble information for the new hash table entry. Specifically, the terminal node in the binary radix tree 182 for the next smaller key value, is accessed to obtain a pointer to the associated hash table entry. The hash table entry is then accessed and the accumulated count N is retrieved from the hash table entry. This accumulated count value will be used in developing a new accumulated count value for the new hash table entry that will be added.

The following steps are directed to initializing a new hash table entry in the hash table 180 for the new key value. In step 336, the new key value is processed through the hash function, shown in FIG. 5C, to identify a hash table entry that will be used with the key value. If the hash table 180 has become full, then in step 338, the hash table 180 will be reorganized to provide additional storage space and then the hash function will be reapplied in accordance with FIG. 5C to identify a hash table entry in step 338.

After steps 336 or 338, the hash table entry for the new key entry has been identified. In the next step 340, a code for the new key value must be selected, in accordance with the process of FIG. 5D. If a key code is available and can be used for the new key value, processing will continue directly to step 344. However, if no key codes are available then an overflow condition will occur, and in step 342, the key codes in the EVI symbol table and the encoded vector index will be reorganized to provide available key codes for the new key value. Then a new key value will be selected in accordance with the process of FIG. 5D.

After step 240 or step 342, in step 344 intermediate and terminal nodes are added to the binary radix tree 182 to reflect the binary representation of the new key value. The terminal node is modified to include a pointer to the hash table entry identified in step 346 or step 348. Next in step 346, the new key value is stored in the hash table entry along with a count value of one. The accumulated count value in the hash table entry is set to be N+1 where N is the accumulated count retrieved from the next smaller key value. The code selected in step 340 or step 342 is also stored in the identified hash table entry.

After step 346 or step 330, the count and accumulated count statistics in a hash table entry have been updated to reflect the insertion of the new record into the table. The accumulated count statistics in a hash table entry have been updated to reflect the insertion of a new record into the table. The accumulated count statistics for all hash table entry subsequent to this hash table entry must also be updated. This is done by a process beginning in step 348, in which the binary radix tree 182 is scanned for the next larger key value. If the scan results in identification of a terminal node in step 350, then the pointer in this terminal node is followed to the associated hash table entry, and the accumulated count in that hash table entry is incremented. If the scan of the binary radix tree 182 for larger key values terminates in a null pointer in step 353, then all larger key values have been updated, and the process of FIG. 5A is done. It will be noted that in steps 348, 350 and 352 will be repeated for each key value larger than the new key value that has been added to the EVI symbol table 127, so that all accumulated statistics in the hash table entries are updated to reflect the insertion of a new key value into the table.

Figure 5B:
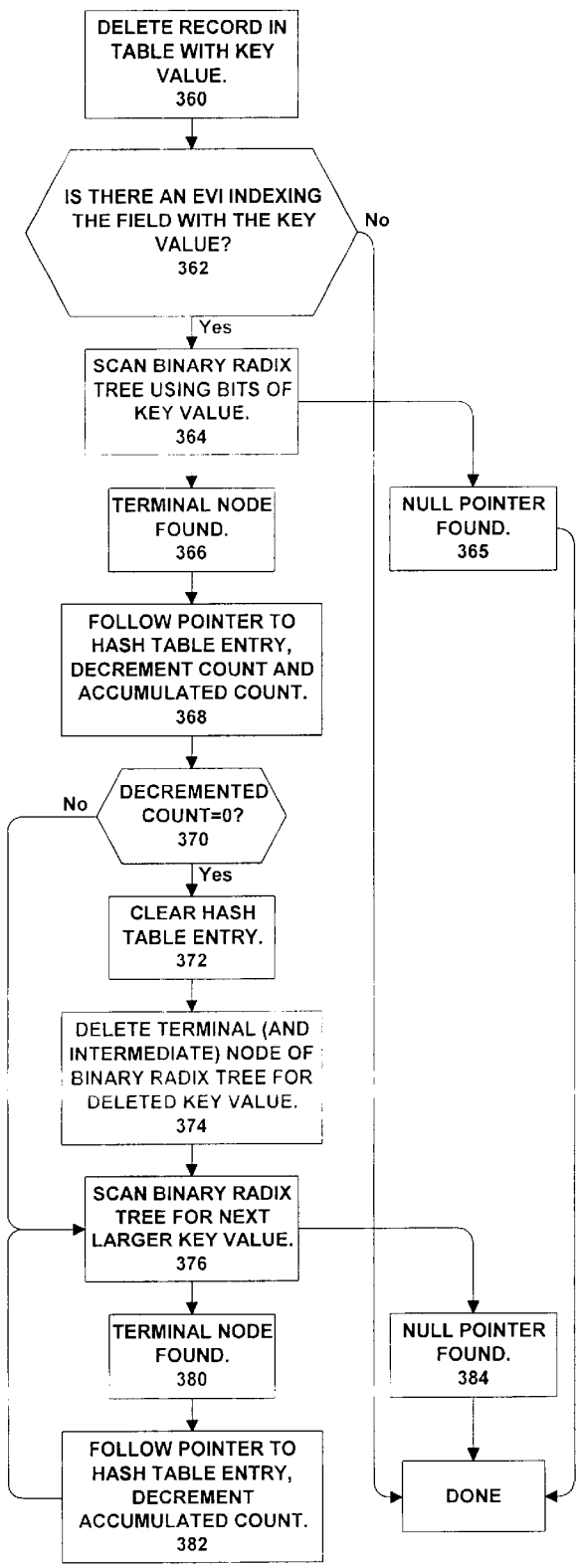

Referring now to FIG. 5B, the process for deleting a record from the a database can be described. This process is performed whenever a record is deleted from a table in step 360. In a first step 362, it is determined whether there is an encoded vector index for the deleted record. If not, the process of FIG. 5B is done. If there is an encoded vector index then this index must be updated. In step 364, the binary radix tree 182 is scanned using bits of the binary representation of the key value of the deleted record. If this scan terminates with a null pointer in the binary radix tree 182 in step 365, then the deleted key value was not in the EVI symbol table the process of FIG. 5B is done. If a terminal node is found at the end of this scan in step 366, then the terminal node is accessed to obtain a pointer to a hash table entry. In step 368, this hash table entry is accessed and the count and accumulate count values in this hash table entry are decremented to reflect deletion of a record having that key value. Thereafter in step 370, it is determined whether the key value should be deleted from the EVI symbol table 127 for the reason that all instances of the key value have been removed from the database. Specifically, in step 370 it is determined whether the decremented count value in hash table entry is at a value of zero. If so, then in step 372 the hash table entry is cleared and in step 374, the terminal node for the deleted key value, as well as any intermediate nodes leading only to that terminal node, are deleted from the binary radix tree 182. After steps 374, or after step 370, if the decremented count value is greater than zero, a sequence of steps is performed to update the accumulated count values in other hash table entries. Specifically, in step 376, binary radix tree 182 is scanned for the next larger key value stored in the EVI symbol table 127. If this scan arrives at a terminal node in step 380, then in step 382 the pointer in the terminal node is followed to a hash table entry, and that hash table entry is updated by decrementing the accumulated count therein to reflect the deletion of a key value. After step 382, processing returns to step 376 to scan for the next larger key value. After all larger key values have been processed by these steps 376, 380 and 382, the scan of step 376 will terminate at a null pointer 384, and the updating process of FIG. 5D will be done.

Figure 5C:
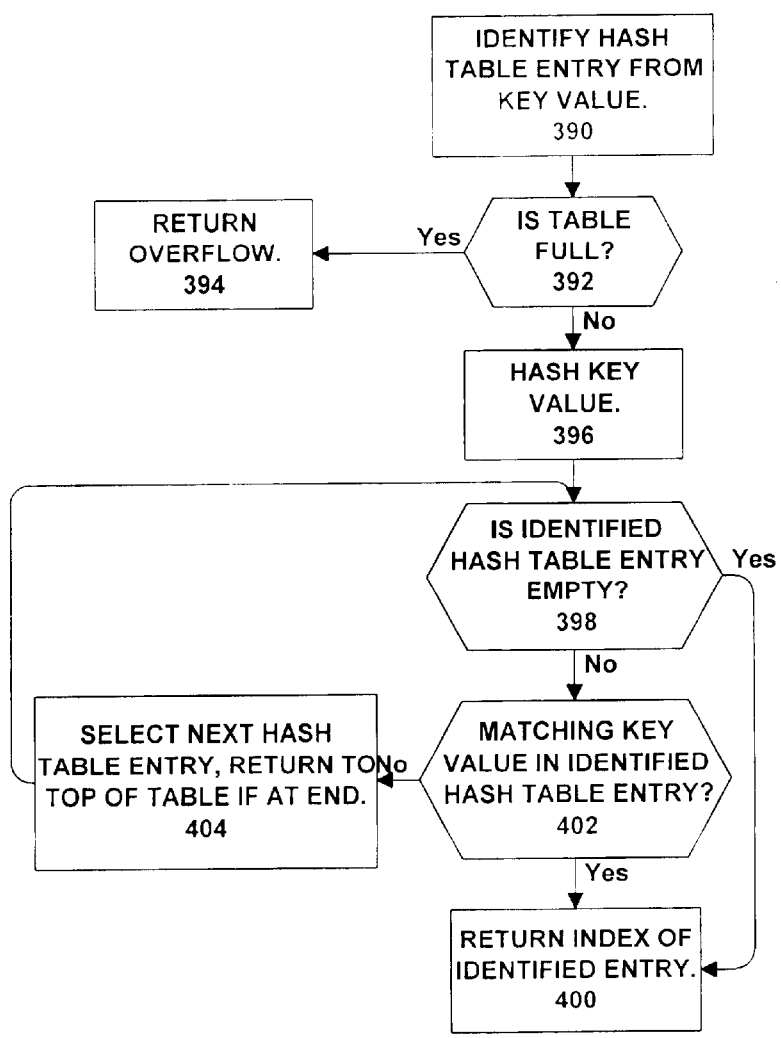

Referring now to FIG. 5C, a process for identifying a hash table entry from a key value can be described. This process starts with step 390 when a hash table entry is requested, for example, in step 336 or 338 of FIG. 5A. In a first step of this process it is determined in step 392 whether the hash table 180 is currently full, i.e., all hash table entries have been assigned to key values. If so, then in step 394 an overflow condition is returned, which will lead to reorganization of hash table 180 to include a larger number of entries as discussed above. If the table is not full, then in step 396 a hash function is assigned to the binary representation of the key value. Hash functions are known in the art and one of any possible candidate hash functions may be used for step 396. After applying the hash function, in step 398 the result of the hash function is used as an index into the hash table 180, and the identified hash table entry is evaluated to determine whether that hash table entry is currently empty and available for use. This is determined by tricking the distinct value field of the hash table entry for a non blank distinct value. If the identified hash table entry for a non blank distinct value. If the identified hash table entry has an empty field for distinct value, then the index of the hash table entry is returned in step 400. However, if the identified hash table entry is not empty, then in step 402 it is determined whether the key value in the identified hash table entry matches the key value delivered to the hash function. If so, then the hash table entry is already assigned to the key value, and the index of this hash table entry if returned in step 400. If the key value in the hash table entry does not match the hash key, then in step 404 the next hash table entry is selected so that the next hash table entry may be evaluated. After selecting the next hash table entry, if the end of the hash table 180 has been reached then the first hash table entry is selected. After selecting the next hash table entry in step 404, processing returns to step 398 to determine whether the new identified hash table entry is empty. Steps 398, 402 and 404 will repeat, linearly stepping through the hash table entries, until an empty hash table entry is identified, at which time, the index of the identified entry will be returned in step 400.

It will be appreciated that for efficiency purposes, the hash table 180 should be sized so as to the larger than the greatest number of unique key values that are expected to appear in the EVI symbol table 127. The size of the hash table 180 is also chosen to minimize storage requirements. For example, if the number of distinct values in the symbol table is expected to be one hundred, then a hash table 180 of approximately ten times this size, or 999 entries is likely to be efficiently useable in accordance with the principles of the present invention. The ratio of the hash table size to the number of distinct values expected may be adjusted for particular applications as desired. The time complexity of the out rhythm of FIG. 5C is inversely proportional to the square of the ratio of the number of distinct values to the hash table size, thus, efficiency of the hashing function may be established at any desire level by adjustment of the hash table size relative to the number of distinct values expected to be used in the hash table.

Figure 5D:
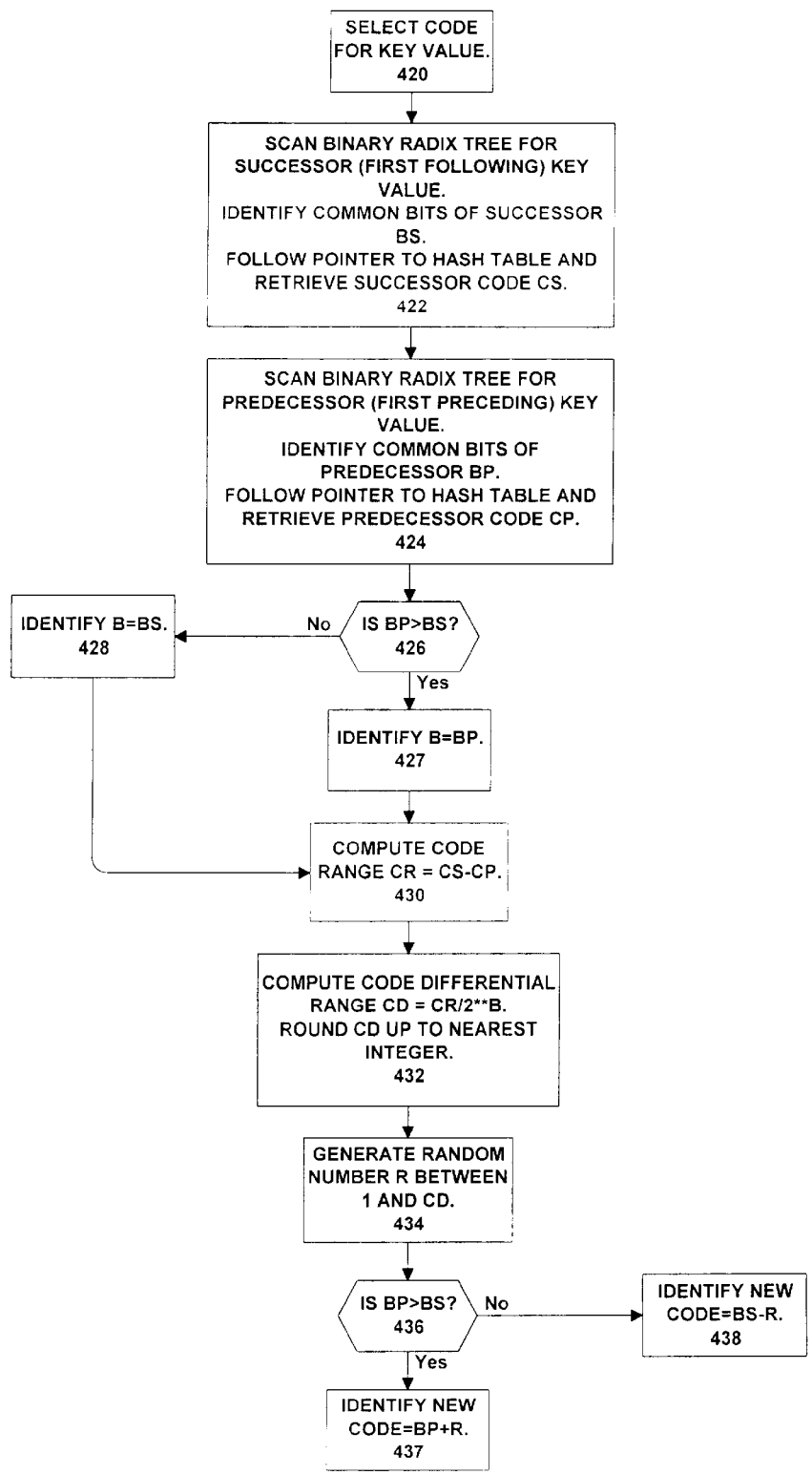

Referring now to FIG. 5D, a process for selecting a code for a key value can be described. This process is initiated in step 420 when a new key value code is desired for an inserted key value in a table such as at steps 340 or 342 in FIG. 5A. As noted above, sequentially allocated codes have the disadvantage that insertions into the EVI symbol table 127 require reallocation of all key value codes. As also noted above, distribution of the codes can substantially reduce the necessity for reorganization of codes upon table insertions.

Code values are created by identifying code values for predecessor and successor key values in the EVI symbol table 127, and then computing a code value for a new key value based upon the codes values of the predecessor and successor and the similarity of the new key value of the predecessor and successor key values. In the first step 422, the binary radix tree 182 is scanned to find a successor key value to the key value for which a code is being generated. A successor key value is the first following key value in the ordering of the key values. When this successor key value is found, the bits of the binary representation of the successor key value are compared to the bits of the binary representation of the new key value to identify a number of common bits between the two values, which number will be represented by the variable BS. After this is done, then the pointer in the terminal node for the successor key value is followed to an entry of the hash table for that successor key value, and the code for the successor key value CS is retrieved. In step 424, similar operations are performed for a predecessor key value, including scanning the binary radix tree for the predecessor key value, identifying the number of bits in the binary representation of the predecessor key value that are equal that are identical to the binary representation of the new key value which is represented by the value BP. Also, the hash table entry for the predecessor key value is evaluated to obtain the code CP for the predecessor key value.

It will be appreciated in steps 422 and 424, the count of common bits in the predecessor key value and successor key value with the new key value are generated by comparing the binary representation of the key values beginning from the most significant, typically left most bit of each binary representation and comparing bits from left to right until a difference is identified. The resulting values BS and BP are representative of the relative closeness of the new key value to the predecessor and successor, and thus can be used to choose a code value for the new key value similarly positioned relative to the code values of the predecessor and successor key values.

To identify an appropriate key value based upon the predecessor and successor code values CP and CS, first, the greatest number of common bits must be identified. If in step 426 the common bits with the predecessor is greater than successor, then the greatest number of bits, identified by the variable B, is said equal to BP, the number of common bits in the predecessor (step 427). Otherwise the greatest number of common bits is said equal to the number of common bits with the successor BS (step 428). Next, the code range CR, between the predecessor and successor codes is computed by subtracting the predecessor code from the successor code in step 430.

Based upon the information gathered, the new code can be created by first identifying the code differential range CD which is equal to $CR/2^B$. This code differential range indicates the difference between the new code and the closest of the predecessor and successor codes. It will be noted that code differential range will be larger when the new key value has fewer common bits with both the predecessor and successor. If the new key value has many bits in common with one of the predecessor and successor, then the code differential range will be proportionally smaller, ultimately causing the new selected code to be near to the predecessor or successor code depending upon which one of the predecessor and successor have more common bits. After completing the new differential CD and rounding this value to the nearest integer, in step 432, in step 434 a random number R is generated that is between 1 and the code differential CD, then depending upon whether the predecessor or successor have more common bits, the random number R is added to the predecessor code BP in step 437 or that the number R is subtracted from the successor code BS in step 438.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising providing a hash table comprising a plurality of entries, entries of said hash table for storing associated key values and codes, assigning code values to key values from said database, assigning a hash table entry to a key value from said database by performing a hash function upon a binary representation of said key value to produce an index into said hash table identifying a hash table entry, and storing respective key values and respective code values assigned to those key values into respective hash table entries assigned to said respective key values in said assigning step.

2. The method of claim 1 wherein entries of said hash table are further for storing a count of occurrences in said database of a key value stored in a hash table entry.

3. The method of claim 1 wherein entries of said hash table are further for storing an accumulated count of occurrences in said database of a key value stored in a hash table entry, and key values that precede, in a key value ordering, a key value stored in said hash table entry.

4. The method of claim 1 further comprising providing a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value.

5. A computer system storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising storage including a hash table comprising a plurality of entries, respective entries of said hash table storing respective key values and respective codes assigned to those key values, and computing circuitry assigning code values to key values from said database, and assigning a hash table entry to a key value from said database by performing a hash function upon a binary representation of said key value to produce an index into said hash table identifying a hash table entry.

6. A program product for storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising a hash table comprising a plurality of entries, respective entries of said hash table storing respective key values and respective codes assigned to those key values, relational database software assigning code values to key values from said database, and assigning a hash table entry to a key value from said database by performing a hash function upon a binary representation of said key value to produce an index into said hash table identifying a hash table entry, and a signal bearing media bearing the hash table and relational database software.

7. The program product of claim 6 wherein the signal bearing media comprises transmission media.

8. The program product of claim 6 wherein the signal bearing media comprises recordable media.

9. A method of identifying locations of data structures relating to key values used in an encoded vector index, comprising providing a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value.

10. A computer system identifying locations of data structures relating to key values used in an encoded vector index, comprising storage including a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value, and computing circuitry for scanning said binary radix tree to identify a terminal node and pointer to a hash table entry storing a key value.

11. A program product identifying locations of data structures relating to key values used in an encoded vector index, comprising a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value, relational database software for scanning said binary radix tree to identify a terminal node and pointer to a hash table entry storing a key value, and a signal bearing media bearing the binary radix tree and relational database software.

12. The program product of claim 11 wherein the signal bearing media comprises transmission media.

13. The program product of claim 11 wherein the signal bearing media comprises recordable media.

14. A method of assigning codes to key values used in a encoded vector index, comprising providing an encoded vector index comprising a plurality of entries, each entry in said encoded vector corresponding to a record of a database, each entry in said encoded vector for storing a code corresponding to a key value in a field of the corresponding record of said database, assigning codes to each key value in said field of said database, said codes assigned such that when said codes are sorted according to a code ordering, the key values corresponding to said codes are also sorted according to a key value ordering, distributing said codes such that at least one pair of adjacent codes in said code ordering have nonsequential values.

15. The method of claim 14 further comprising selecting a code corresponding to an inserted key value, for use in said encoded vector index, by the steps of identifying, from key values corresponding to codes in said encoded vector index, a successor key value subsequent to said inserted key value in said key value ordering, and a successor code corresponding to said successor key value, identifying, from key values corresponding to codes in said encoded vector index, a predecessor key value prior to said inserted key value in said key value ordering, and a predecessor code corresponding to said predecessor key value, comparing said inserted key value to said predecessor key value and said successor key value to identify one of said predecessor and successor key value as closer to said inserted key value, selecting an inserted code for said inserted key value that is between said predecessor and successor codes in said code ordering, said inserted code selected to be closer in said code ordering to said successor or predecessor code based upon the results of said comparing step.

16. The method of claim 15 wherein said comparing step comprises comparing binary representations of said predecessor key value and successor key value to said inserted key value to identify a number of common bits between said inserted key value and said predecessor and successor key value, and identifying a greatest number of common bits between said inserted key value and said predecessor and successor key values.

17. The method of claim 16 wherein said selecting step comprises computing a range of code values between said predecessor code and said successor code, and then computing a biased range based upon a ratio of said range to a factor derived from said greatest number of common bits.

18. The method of claim 17 wherein said selecting step further comprises selecting a random integer bounded by the magnitude of said biased range, and then selecting a code that is offset from said predecessor code or successor code by said random positive integer.

19. A computer system assigning codes to key values used in a encoded vector index, comprising storage including an encoded vector index comprising a plurality of entries, each entry in said encoded vector corresponding to a record of a database, each entry in said encoded vector for storing a code corresponding to a key value in a field of the corresponding record of said database, and computing circuitry assigning codes to each key value in said field of said database, said codes assigned such that when said codes are sorted according to a code ordering, the key values corresponding to said codes are also sorted according to a key value ordering, and distributing said codes such that at least one pair of adjacent codes in said code ordering have nonsequential values.

20. A program product for assigning codes to key values used in a encoded vector index, comprising an encoded vector index comprising a plurality of entries, each entry in said encoded vector corresponding to a record of a database, each entry in said encoded vector for storing a code corresponding to a key value in a field of the corresponding record of said database, relational database software assigning codes to each key value in said field of said database, said codes assigned such that when said codes are sorted according to a code ordering, the key values corresponding to said codes are also sorted according to a key value ordering, and distributing said codes such that at least one pair of adjacent codes in said code ordering have nonsequential values, and a signal bearing media bearing the encoded vector index and relational database software.

21. The program product of claim 20 wherein the signal bearing media comprises transmission media.

22. The program product of claim 20 wherein the signal bearing media comprises recordable media.

23. A method of storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising storing in respective storage locations of said symbol table, respective key values and respective code values assigned to those key values, storing in a storage location of said symbol table, an accumulated count of occurrences in said database of a key value stored in sad storage location, and occurrences of key, values that precede, in a key value ordering, said key value stored in said storage location.

24. The method of claim 23 further comprising storing in a storage location of said symbol table, a count of occurrences in said database of a key value stored in a said storage location.

25. The method of claim 23 applied to responding to a request for a key range count identifying a beginning and ending key value, comprising retrieving from a storage location of said symbol table associated with said beginning key value, an accumulated count for said beginning key value, retrieving from a storage location of said symbol table associated with said ending key value, an accumulated count for an ending key value, and computing said key range count by subtracting said accumulated count for said beginning key value from said accumulated count for said ending key value.

26. The method of claim 23 applied to insertion of an inserted key value into said symbol table, comprising storing in a storage location of said symbol table, said inserted key value and a code value assigned to said inserted key value, retrieving from a storage location of said symbol table associated with a key value immediately preceding said inserted key value in a key value ordering, an accumulated count, incrementing said retrieved accumulated count and storing the incremented accumulated count in said storage location of said symbol table associated with said inserted key value, incrementing accumulated counts stored in storage locations of said symbol table associated with key values that are subsequent to said inserted key value in said key value ordering.

27. The method of claim 23 applied to deletion of an occurrence of a deleted key value from said symbol table, comprising decrementing an accumulated count in a storage location of said symbol table associated with said deleted key value, decrementing accumulated counts stored in storage locations of said symbol table associated with key values that are subsequent to said deleted key value in said key value ordering.

28. The method of claim 25 wherein, when said beginning key value is not associated with a storage location of said symbol table, said beginning key value is established to have a value of zero.

29. The method of claim 25 wherein, when said ending key value is not associated with a stoage location of said symbol table, said ending key value is retrieved from a storage location of said symbol table associated with a last key value in a key value ordering.

30. The method of claim 29 wherein, when said deleted key value no longer appears in said field of said database, said method further comprises clearing said storage location of said symbol table associated with said deleted key value.

31. A computer system for storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising storage including a symbol table, and computing circuitry storing in respective storage locations of said symbol table, respective key values and respective code values assigned to those key values, and storing in a storage location of said symbol table, an accumulated count of occurrences in said database of a key value stored in said storage location, and occurrences of key values that precede, in a key value ordering, said key value stored in said storage location.

32. A program product for storing a symbol table for an encoded vector index, said encoded vector index comprising a plurality of entries, each entry in said encoded vector corresponding to a record of a database, each entry in said encoded vector for storing a code corresponding to a key value in a field of the corresponding record of said database, said symbol table identifying codes corresponding to key values in said field, comprising a symbol table, relational database software storing in respective storage locations of said symbol table, respective key values and respective code values assigned to those key values, and storing in a storage location of said symbol table an accumulated count of occurrences in said database of a key value stored in said storage location, and occurrences of key values that precede, in a key value ordering, said key value stored in said storage location, and a signal bearing media bearing the binary radix tree and relational database software.

33. The program product of claim 32 wherein the signal bearing media comprises transmission media.

34. The program product of claim 32 wherein the signal bearing media comprises recordable media.

* * * * *

UNITED STATES PATENT AND TRADEMARK OFFICE
CERTIFICATE OF CORRECTION

PATENT NO.    : 6,725,223 B2
DATED         : April 20, 2004
INVENTOR(S)   : Abdo Esmail Abdo, Kevin James Kathmann and Kurt Walter Pinnow It is certified that error appears in the above-identified patent and that said Letters Patent is hereby corrected as shown below:

<u>Column 18,</u>
Lines 1-42, claims 9, 10 and 11, should read as follows:
-- 9.  A method of identifying locations of data structures relating to key values used in an encoded vector index, comprising
      providing an encoded vector index comprising a plurality of entries, each entry in said encoded vector corresponding to a record of a database, each entry in said encoded vector for storing a code corresponding to a key value in a field of the corresponding record of a database,
      providing a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value.

10.    A computer system identifying locations of data structures relating to key values used in an encoded vector index, comprising
      storage including an encoded vector index comprising a plurality of entries, each entry in said encoded vector corresponding to a record of a database, each entry in said encoded vector for storing a code corresponding to a key value in a filed of the corresponding record of said database, and
      storage including a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value, and
      computing circuitry for scanning said binary radix tree to identify a terminal node and pointer to hash table entry storing a key value.

UNITED STATES PATENT AND TRADEMARK OFFICE
CERTIFICATE OF CORRECTION

PATENT NO. : 6,725,223 B2
DATED : April 20, 2004
INVENTOR(S) : Abdo Esmail Abdo, Kevin James Kathmann and Kurt Walter Pinnow It is certified that error appears in the above-identified patent and that said Letters Patent is hereby corrected as shown below:

<u>Column 18, (cont.)</u>
11. A program product identifying locations of data structures relating to key values used in an encoded vector index, comprising
    an encoded vector index comprising a plurality of entries, each entry in said encoded vector corresponding to a record of a database, each entry in said encoded vector for storing a code corresponding to a key value in a field of the corresponding record of said database,
    a binary radix tree comprising a plurality of nodes, nodes of said tree corresponding to binary digits of a binary representation of a key value, branches in said tree corresponding to values of binary digits of said binary representation, a path through said tree corresponding to a binary representation of a key value ending in a terminal node containing a pointer to a hash table entry storing said key value,
    relational database software for scanning said binary radiz tree to identify a terminal node and pointer to a hash table entry storing a key value, and
    a signal bearing media bearing the binary radiz tree and relational database software. --

Signed and Sealed this

Tenth Day of August, 2004

JON W. DUDAS
*Acting Director of the United States Patent and Trademark Office*